UNITED STATES PATENT OFFICE.

WILLIAM F. SPECK, OF CHICAGO, ILLINOIS, ASSIGNOR OF ONE-HALF TO NELSON L. TOWLE, OF EVANSTON, ILLINOIS.

CANDY AND OTHER FOOD PRODUCTS AND THE PROCESS OF MAKING SAME.

1,371,450. Specification of Letters Patent. Patented Mar. 15, 1921.

No Drawing. Application filed March 13, 1919. Serial No. 282,413.

*To all whom it may concern:*

Be it known that I, WILLIAM F. SPECK, a citizen of the United States, residing at Chicago, in the county of Cook and State of Illinois, have invented certain new and useful Improvements in Candy and other Food Products and the Process of Making Same, of which the following is a specification.

This invention relates to a process for the manufacture of candy and other food products and to the product produced thereby.

When water is used as the liquefying element in making candy or other food products, the length of time the same will keep in good condition is short due to deterioration resulting from the loss of moisture through evaporation, or the absorption of moisture from the atmosphere, according to the temperature of cooking and type of ingredient. These and other objections are overcome in the present invention in which I use fats as the liquefying element and apply coloring and if desired flavoring, to the "point of origin", as the result of which I am able to produce a product which will be of great nutrition, very palatable, and which may be produced in substantially all colors; in many forms; and of maximum permanency.

Among the objects of my invention is to produce candy and other food products capable of keeping for long periods of time without substantial deterioration; by the use of fats as the liquefying ingredient; further to make possible the production of such products in substantially any and all colors without impairing its edibility; further to utilize the material of this invention throughout the entire body of the product, or to use it to enrobe or cover various confections, the liquefying ingredient of which may be other than fat (such for example as water); further to produce a product of great nutrition and very palatable; further to produce a confection or other food product in which the flavor, aroma, palatable consistency, color and edibility is of maximum permanency; further to produce a desirable and palatable "spread" for any food product; and such further objects, advantages and capabilities as will later more fully appear.

In carrying out my invention I add the coloring and flavoring to the "point of origin", an instance of which point is ordinary cane sugar. The resulting product is then put in proper combination with fat (cocoa butter being an instance) together with other desirable ingredients (powdered milk or peanut butter as an instance), and the properly proportioned mass thus produced is then milled together to great fineness.

At the proper temperature this product is molded, or produced in such forms as is chocolate, or in any other form desired. It will also be used to enrobe or cover other bon-bons and confections, the liquefying ingredients of which are other than fats, as for example water; and will also be used as a "spread" for various food products, as for instance icing or filling for cake or bread, filling for sandwiches and small cakes, and other similar uses for increasing the palatability of various foods.

While I have named certain examples and instances of the "point of origin," the fats, and other desirable ingredients that may be mixed therewith, I do not wish to be limited to the instances or examples named as it is obvious that there is a more or less wide range of materials capable of use in carrying out my invention. Among the more important features of this invention are the use of fat as the liquefying ingredient, and the addition of the coloring (either alone or with flavoring) to the point of origin before it is mixed with the fat and other desirable ingredients. This enables me to produce candy and other food products, having fat as the liquefying element of any color desired without detracting from its edibility, and at the same time adding greatly to its attractive appearance.

It is of course to be understood that I use in carrying out this invention only such coloring materials (whether of vegetable origin or otherwise) as conform to the requirements of the pure food laws. By adding the coloring matter to the sugar or other point of origin, the step of milling these with the fat causes a thorough and effective mixing of the color with the fat; whereas if the color were added directly to the fat such thorough mixing would be impossible as the fat and coloring matter would resist each other as does oil and water, thus resulting in the refusal of the fat to take up the coloring matter. Under my process this mixture is thoroughly accomplished to produce an even color throughout and of any desired shade. This I consider broadly new in the art.

The term "point of origin" has been used herein to designate the material used as a sweetening base or starting point such as sugar, a mixture of sugar and starch, or any other material that may be desired and appropriate in this connection, it being obvious that various materials may be used for this purpose as a sweetening base or starting point without departing from the spirit of my invention.

I claim:—

1. The process of making a colored confection-like food product which consists in adding coloring matter to the sugar or other like "point of origin" to color the same, adding said colored sugar or other like point of origin to an edible fat, and thoroughly mixing them together to produce a product of uniform color in any desired shade.

2. The process of making candy and other food products which consists in coloring the sugar or other "point of origin," combining this with cocoa butter or other edible fat, together with powdered milk, peanut butter or the like, milling the resultant mass to great fineness, and then forming into desired shapes or applying as a coating as desired.

3. A confection-like food product, comprising sugar or other like "point of origin", an edible fat, and an edible coloring matter incorporated with said sugar or other like "point of origin" prior to its addition to said fat, the said combined sugar or other like point of origin and coloring matter being thoroughly mixed with said fat to produce a uniform color in any desired shade.

In witness whereof, I hereunto subscribe my name to this specification.

WILLIAM F. SPECK.